United States Patent Office 3,702,226
Patented Nov. 7, 1972

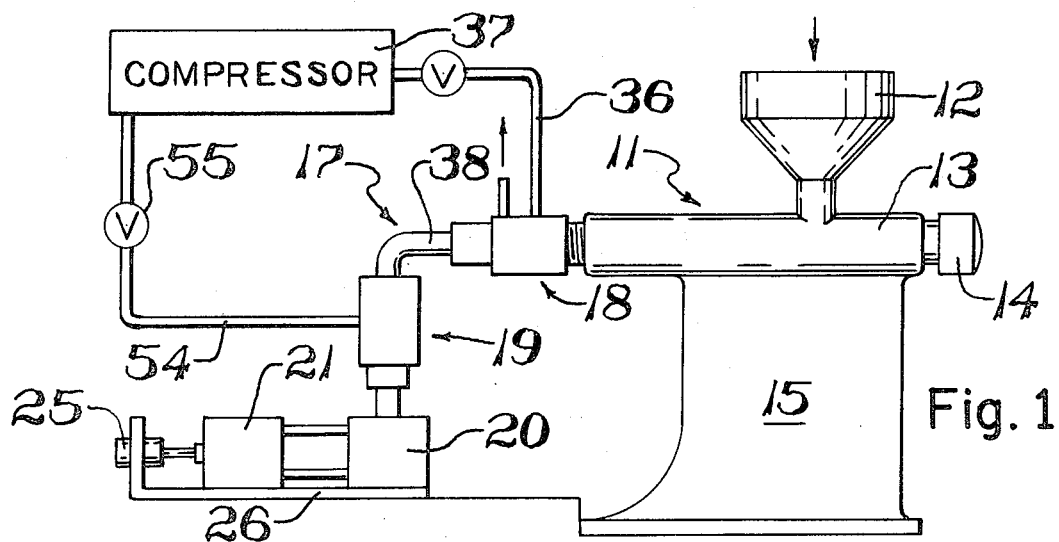
Fig. 1
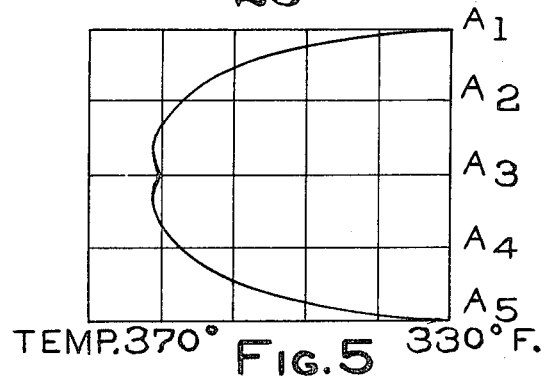
TEMP. 370°  Fig. 5  330° F.
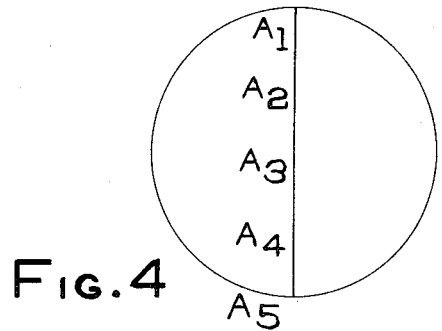
Fig. 4
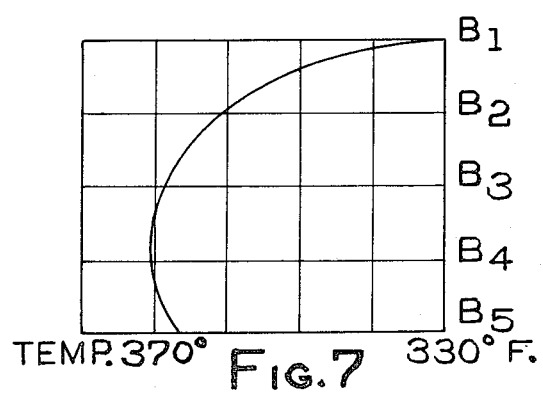
TEMP. 370°  Fig. 7  330° F.
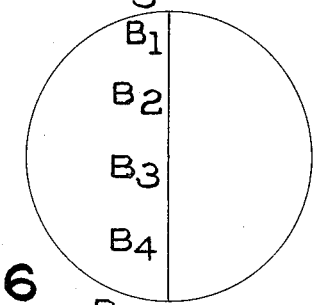
Fig. 6
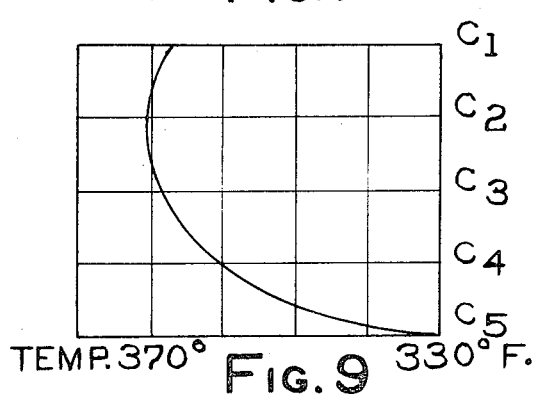
TEMP. 370°  Fig. 9  330° F.
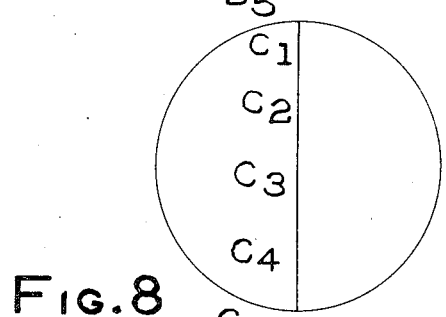
Fig. 8
INVENTORS
HEUNG T. KIM
BY JOHN P. DARBY
Joseph Januszkiewicz
ATTY.

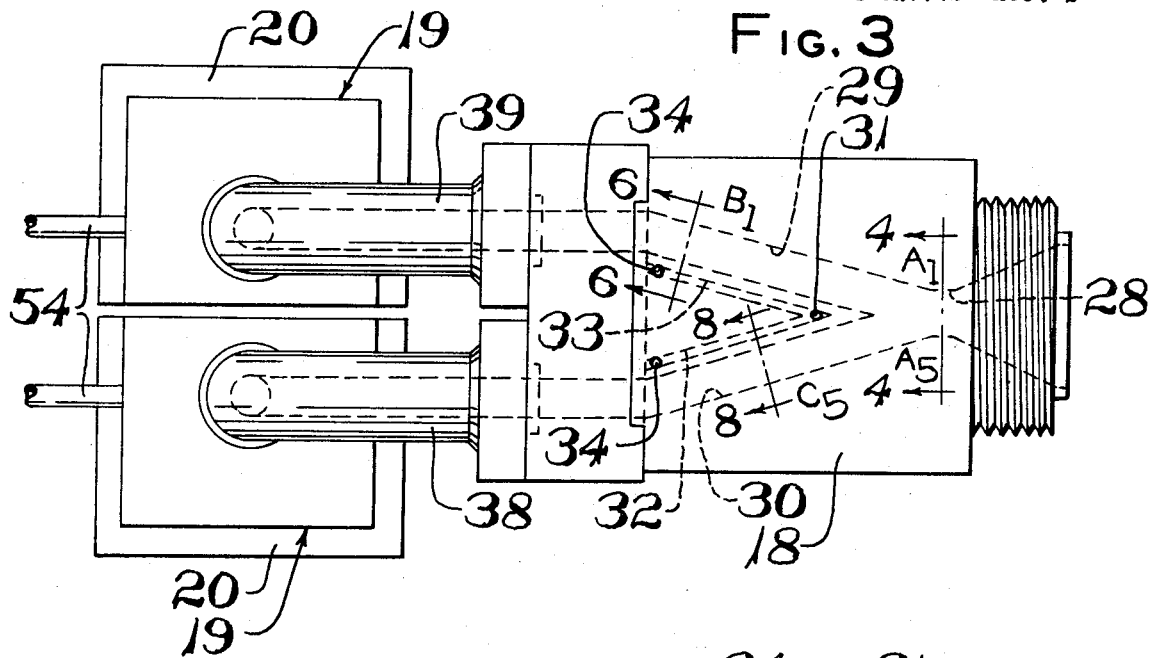
FIG. 3
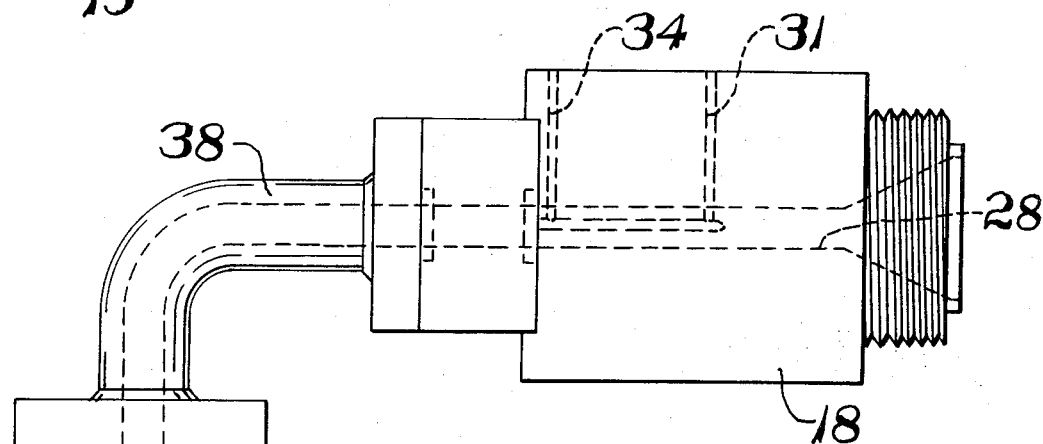
FIG. 2
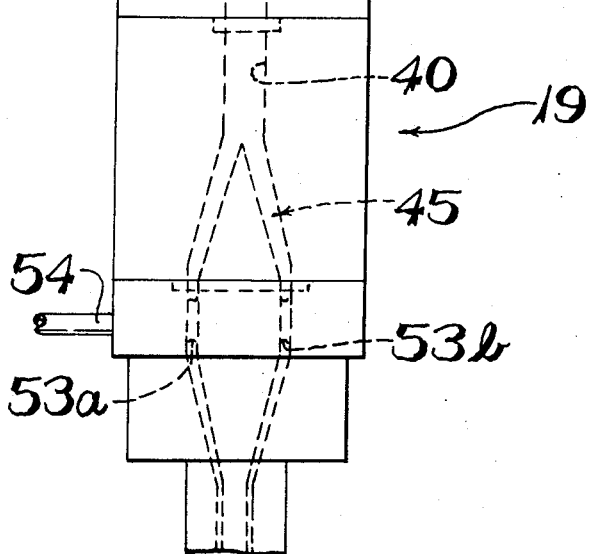

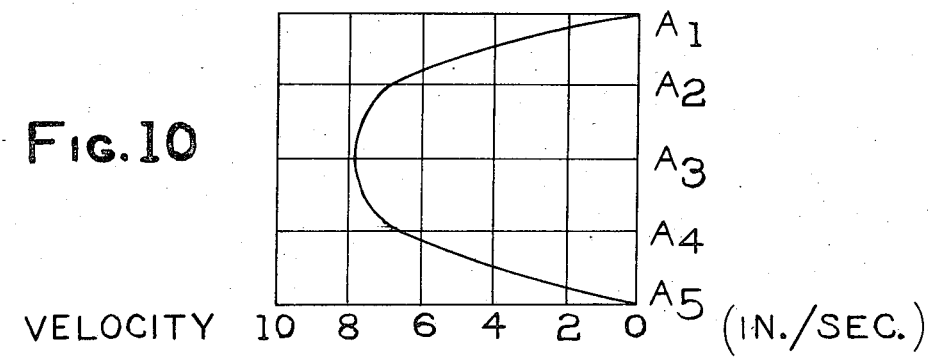
Fig.10
Fig.11
Fig.12
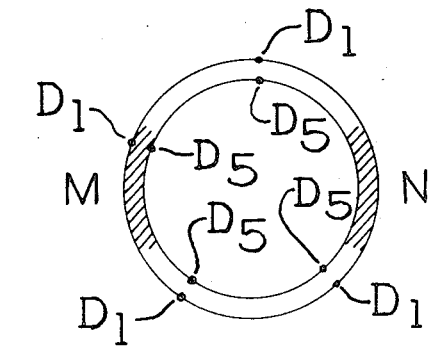
Fig.13

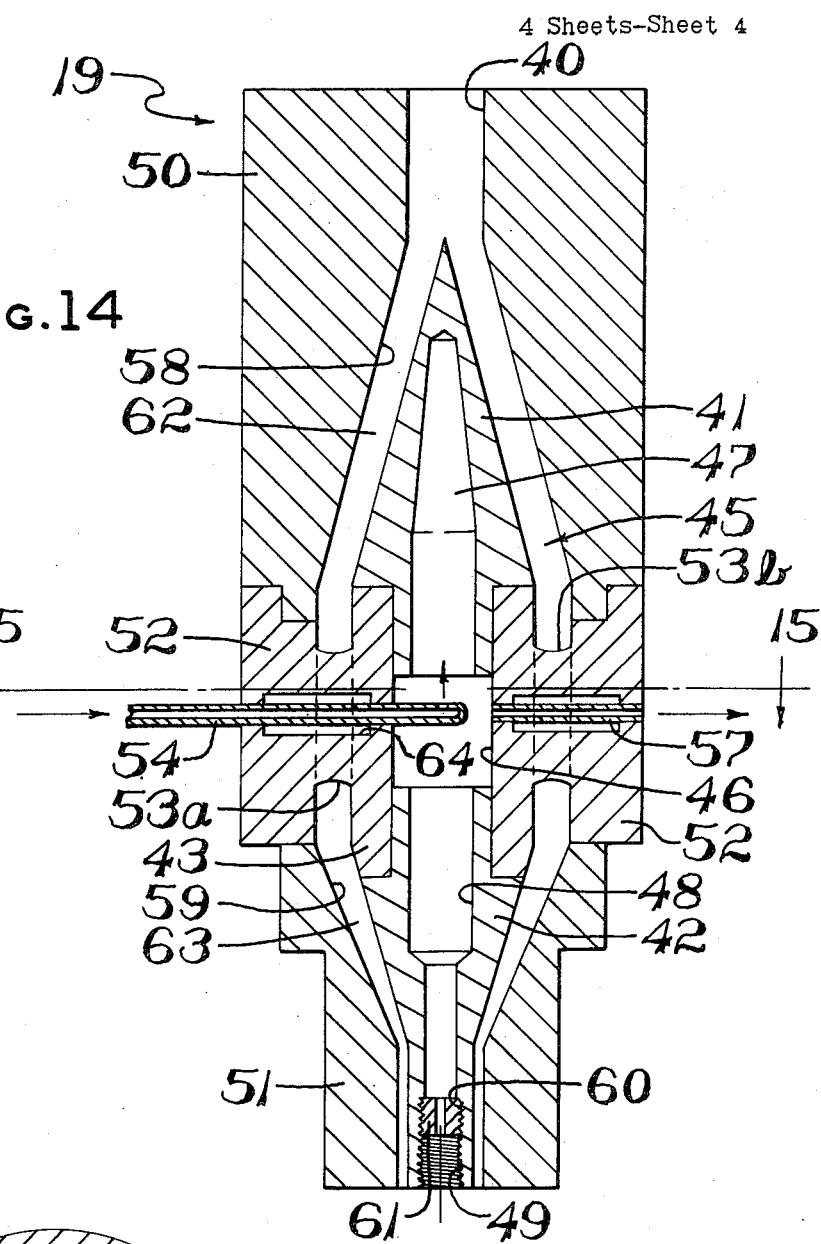
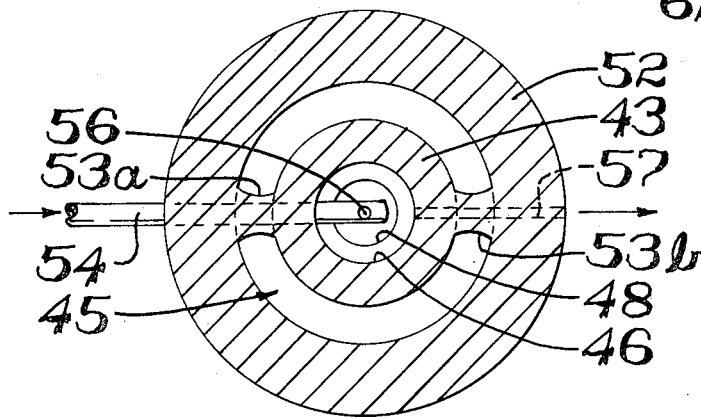

3,702,226
PLASTIC MOLDING
Heung T. Kim, Avon Lake, Ohio, and John P. Darby, Pompano Beach, Fla., assignors to The B. F. Goodrich Company, New York, N.Y.
Filed Jan. 20, 1971, Ser. No. 108,087
Int. Cl. B29j 5/06
U.S. Cl. 425—326
7 Claims

ABSTRACT OF THE DISCLOSURE

The molding of plasticized material wherein the die assembly has its mandrel cooled to restore a symmetrical heat and velocity profile to the annular melt and in addition provides means for the cooling of an adapter which divides the original plasticized melt from the extruder into two cylindrical cross sectioned streams of material for movement into two separate dies. The adapter is cooled to restore the temperature and velocity profile.

BACKGROUND OF THE INVENTION

This invention relates to plastic molding and more particularly to a blow molding extruder having an adapter which divides the main flow of the extrudate into two separate flow channels which exit at spaced points for use in the blow molding process.

Blow molding is the process where a hollow extrusion of plasticized molding material (a parison) is charged into a mold and therein shaped to the contour of the mold by air pressure applied inside the parison. Non-circular bottles are often difficult to mold because sections of maximum elongation of the parison wall becomes thinner than the remainder of the parison thereby providing a bottle of non-uniform wall thickness. With the present day high speed blow molding machines, considerable difficulty has been experienced in the hot end of the extruder. To alleviate these problems, considerable work has been done to improve compounding and better plasticization than previously used.

With the use of faster cycling machinery and with the use of higher molecular weight material greater problems in processing were encountered such as limitation on the extent to which an extruder could operate before it was closed down for cleaning, or in the appearance of die lines in the extrudate. In addition, it became more difficult to maintain thickness as the run progressed, requiring a shut down to clean the extruder. Solutions to these problems were directed to screw design, changes in extruder pressures, die design, and the processing of the parison such as controlling the flow as through a programmed variable orifice.

SUMMARY OF THE INVENTION

The present invention is directed to achieving greater runs by maintaining uniform temperature of the melt by selective removal of heat to assure a consistent temperature-velocity profile in the split portions of the extrudate as in the non-split extrudate, as where such split portions are directed to separate molds. The present invention contemplates the utilization of cooling means for the mandrel of a die assembly to restore a symmetrical temperature and velocity profile to the annualar melt and where desired to use an adapter for an extruder and die combination which has means for splitting the single extrudate into two divergent channels, and with such adapter having provisions for directing a coolant therein along the adjacent but spaced wall of the two divergent channels to provide a temperature and velocity profile that is uniform.

BRIEF DESCRIPTION OF THE INVENTION

FIG. 1 is a vertical elevation of a blow molding apparatus;

FIG. 2 is an enlarged elevational view of a section of an extruder adapter (FIG. 1);

FIG. 3 is a plan view of a portion of the apparatus shown in FIG. 2;

FIG. 4 is a cross section of the bore and the extrudate taken along lines 4—4 of FIG. 3;

FIG. 5 is the temperature profile of the extrudate shown in FIG. 4;

FIG. 6 is a cross section of the bore and the extrudate taken along lines 6—6 of FIG. 3;

FIG. 7 is the temperature profile of the extrudate shown in FIG. 6;

FIG. 8 is a cross section of the bore and the extrudate taken along lines 8—8 of FIG. 3;

FIG. 9 is the temperature profile of the extrudate shown in FIG. 8;

FIG. 10 is the velocity profile of the extrudate shown in FIG. 4;

FIG. 11 is the velocity profile of the extrudate shown in FIG. 6;

FIG. 12 is the velocity profile of the extrudate shown in FIG. 8;

FIG. 13 is a cross-sectional view of the extrudate after it has left the extruder;

FIG. 14 is a side elevational view in cross section of the die assembly; and

FIG. 15 is a cross sectional view of the die assembly taken along lines 15—15.

DETAILED DESCRIPTION

Referring to the drawings wherein like reference characters designate like or corresponding parts throughout the several views, there is shown in FIG. 1 a plasticizing and extrusion means 11 having a hopper 12 and an extruder 13 driven by a motor 14 and supported on a base 15. Die means 17 having an adapter 18 and a pair of spaced die assemblies 19—19 is suitably connected to blow molds 20–21. Blow mold 21 as mold 20 contains a pair of molds for receiving charges from the respective pairs of bores of die assemblies 19—19. Blows molds 21 are suitably joined to molds 20 and movable therewith by an actuating cylinder 25. Molds 20 and 21 are suitably mounted on base 26 for reciprocal movement.

Adapter 18 has a central bore 28 which receives the extrudate from the extruder 13. A cross section of bore 28 is shown in FIG. 4 disclosing a circular bore with a point $A_1$ on one sidewall and a point $A_5$ on the opposite sidewall. A point $A_3$ is designated as the center of bore 28, with points $A_2A_4$ midway between points $A_1A_3$ and $A_3A_5$ respectively. Downstream from bore 28, adapter 18 has a pair of diverging bores 29 and 30 which split the extrudate from central bore 28 into two separate streams. A cross section of bore 29 is shown in FIG. 6 disclosing a circular bore with point $B_1$ being on the outer wall surface, point $B_5$ on the inner wall surface and point $B_3$ on the center of bore 29. Points $B_2$ and $B_4$ are midway between points $B_1B_3$ and $B_3B_5$ respectively. A cross section of bore 30 is shown in FIG. 8 disclosing a circular bore with point $C_1$ being on the inner wall surface, point $C_5$ on the outer wall surface and point $C_3$ on the center of bore 30. Points $C_2$ and $C_4$ are midway between points $C_1C_3$ and $C_3C_5$ respectively. As used herein the respective inner wall surfaces lie along longitudinally extending parallel adjacent surfaces for a purpose to be described. A downwardly extending air passageway 31 in adapter 18 is connected to the one ends of a pair of diverging horizontally extending passageways 32 and 33, which passageways 33 and 32 extend closely adjacent to the inner wall surfaces or sidewalls of the respective bores 29 and 30. The respective other ends of passageways 32 and 33 are connected to vertically extending passageways 34 for venting to atmosphere. Passageway 31 is connected via a conduit 36 to a compressor 37 which is regulated in a manner well understood in the art to provide a controlled rate of air flow through passageways 32 and 33. Passageways 29 and 30 are connected via conduits 38 and 39 to die assemblies 19—19 so that the extrudate in the respective passageways 29 and 30 are directed into passageways 40—40, one in each die assembly 19 (FIG. 14). Each die assembly 19 is similar and therefore only one will be described. Die assembly 19 has a mandrel with an upper conical portion 41 and a lower spaced frusto-conical portion 42. Die assembly 19 also has an upper die housing section 50, a lower die housing section 51, and an intermediate die housing section 52 with an inner cylindrical core portion 43, which inner cylindrical portion 43 forms the intermediate portion of the mandrel designated 45. Thus mandrel 45 is composed of an upper conical portion 41, an intermediate cylindrical portion 43 and a lower frusto-conical portion 42 suitably connected together. As shown in FIG. 15, intermediate cylindrical portion 43 is connected to the intermediate die housing section 52 by a plurality of laterally extending ribs 53a and 53b.

The intermediate cylindrical portion 43 of mandrel 45 has a central chamber 46 that communicates directly with an upper chamber 47 in upper conical portion 41. The upper end portion of upper chamber 47 lies closely adjacent to the apex of upper conical portion 41. Lower frusto-conical section 42 has a longitudinally extending stepped bore 48 that connects the central chamber 46 with an outlet opening 49 at the lowermost end portion of the frusto-conical section 42. The lower end portion of bore 48 is threaded as at 60 to receive a throttle valve 61 with a restrictive orifice to provide for the controlled flow of air for the blow molding operation. Such valve 61 may be replaced with other suitable types of control valves to control the flow of pressurized air therethrough. The central chamber 46 receives one end of an air supply conduit 54, which conduit 54 is connected to the compressor 37 via control valve 55. Such one end of conduit 54 in chamber 46 has an orifice 56 (FIG. 15) which directs the pressurized air stream or coolant directly upwardly into upper chamber 47 for impingement on the upper end portion of conical section 41 to extract heat therefrom in a manner to be described. Conduit 54 extends through rib 53a. The central rib portion 53a surrounding conduit 54 is recessed as at 64 (FIG. 14) to provide an annular dead air space which acts as an insulator to preserve the adjusted temperature and velocity profile. A conduit 57 in the intermediate portion of mandrel 45 extends through die housing section 52 including inner cylindrical core portion 43 and rib 53b (FIG. 14) to interconnect central chamber 46 to atmosphere whereby pressurized coolant air from compressor 37 flows via conduit 53 to perform two separate functions. Such air cools the mandrel 45, and is used in blow molding, with the excess being vented to atmosphere through conduit 57.

The central rib portion 53b surrounding conduit 57 is recessed similar to rib 53a to provide an annular dead air space which acts as an insulator to preserve the adjusted temperature and velocity profile.

Upper die housing section 50 has bore 58 that tapers outwardly to accommodate the upper conical portion 41 of mandrel 45 to define an annular passageway 62. Lower die housing section 51 similarly has bore 59 that tapers downwardly and inwardly, and thence is of a consistent diameter to accommodate the frusto-conical portion 42 of mandrel 45 to define an annular passageway 63 that communicates directly with annular passageway 62 except for the necessary by-passing of the ribs 53a and 53b. Such annular passageway 63 provides for the formation of an annular plasticized shape to form the parison which facilitates the blow molding operation.

A thermoplastic material is supplied via hopper 12 to extruder 13, which plasticizes the thermoplastic material as by the feed screw therein driven by motor 14. Suitable heating means may be provided in a manner old and well known in the art. The plasticized material is fed through bore 28 of adapter 18 presenting a temperature profile as shown in FIG. 5 wherein the temperature of the extrudate adjacent to the periphery of the bore 28 is 334° F. while the temperature of the extrudate increases as one approaches the center of the bore 28, where the temperature is approximately 370° F. The differential in temperature which exists between the extrudate adjacent to the walls of the adapter and that of the center is symmetrical when considered across any direction of bore 28. In a similar manner the velocity profile is symmetrical about the central axis as shown in FIG. 10. As this extrudate is divided into the respective bores 29 and 30, a cross section taken of the extrudate along lines 6—6 and 8—8 respectively, the temperature profile across the extrudate is non-symmetrical, being hottest (approximately 370°) along the inner edge of bores 29 and 30 as at points $B-5$ and $C-1$. The temperature along the outer edge of bore 29 (FIG. 6) at point $B_1$ is 334° F., similar to the temperature along the entire periphery of bore 28. The rise in temperature from the respective outer edges $B_1$ and $C_5$ of bores 29 and 30 to the inner edges $B_5$ and $C_1$ is not as steep as that for the symmetrical curve temperature profile of bore 28; however, a comparison of FIGS. 7 and 9 with FIG. 5 clearly depicts the non-uniformity of temperature. Such temperature profile continues along the full extent of bores 29 and 30. In addition, the velocity profile is similarly non-symmetrical and depicted by FIGS. 11 and 12. It is best to compare FIGS. 11 and 12 with the velocity profile of FIG. 10 to note the change in profile from a symmetrical profile to one non-symmetrical. The velocity profile in bore 29 is similar to the temperature profile in that the velocity is greatest at the points closely adjacent to the inner edge of bore 29 (point $B_5$) and falls off at a rapid rate as one approaches the outer edge of bore 29 designated point $B_1$ in FIG. 6. Such concentration of heat in the inner wall section of bores 29 and 30 causes a heat build-up or imbalance which accentuates the temperature differential in the extrudate. Such temperature imbalance in the extrudate will provide on side M (designated by a shaded area) of the annular extrudate (FIG. 13) with a much higher temperature profile causing it to flow faster, which is a result of lower viscosity than the opposite side N (designated by a shaded area) which has a lower temperature, thereby rendering a product which has an uneven wall thickness.

The present invention eliminates the imbalance in heat build-up and resulting velocity differential by conducting a fluid in the form of cooled pressurized air which is conveyed from compressor 37 via conduits 36, 31, 32 and 33 to extract heat by as much as 3.8 B.t.u./lb. of output along the inner wall surface of bores 29 and 30 to change the temperature and velocity profile to the temperature profile and velocity profile of FIGS. 5 and 11.

In a similar manner the spider 45 has compressed air delivered from compressor 37 to conduit 54 which, as stated above, is utilized to cool the entire spider and in blow molding. Unless such cooling was effective, the temperature and velocity profile would be similar to that depicted by FIGS. 7, 9, 11 and 12 where points $B_1$ and $C_5$ would be located along points $D_1$ (of the outer periphery of the annular extrudate) of FIG. 13 and points $B_5$ and $C_1$ would be located along points $D_5$ along the inner periphery of the extrudate. Such uneven concentration of heat on the inner wall surface of the conical portion 41 and die mandrel 45 would cause a temperature and velocity imbalance which accentuates the temperature differential in the extrudate resulting in an uneven flow and viscosity which would be detrimental to achieving a uniform product. Of additional concern is the fact that the heated worked extrudate would degrade at the hot surface of the zone portion 41. By directing pressurized air into conduit 54, and upper chamber 47, the surface of conical portion 41 will be cooled such as to restore the velocity and temperature profile to that of FIGS. 5 and 10 whereby a symmetrically balanced profile is obtained, thereby delivering an extrudate which has a symmetrical temperature and velocity profile. Such consistency in extrudate facilitates the formation of a product which has consistent wall thickness and is free of die lines. With the pressurized air flowing via conduits 54 and 57 through ribs 53a and 53b, the respective dead air spaces surrounding such conduits in the ribs 53a and 53b act as insulators to prevent the air from adversely upsetting the temperature profile and causing a temperature imbalance with respect to the extrudate passing thereby. In lieu of the dead air space 64, an insulating sleeve may be used to surround the conduits 54 and 57 in ribs 53a and 53b to assure that they do not affect the temperature profile which would otherwise result in a non-symmetrical flow. Upon extrusions of the parisons, the mold halves of blow molds 20—20 are closed to confine the parison and facilitate the expansion of the parison into contact with the walls of the mold to form the desired article.

We claim:

1. A die assembly comprising a housing having an inlet means and an outlet means and an elongated central bore extending from said inlet means to said outlet means, a mandrel located in said central bore to provide an angular passageway for extrudate passing through said central bore, said mandrel having a hollow interior defining a single continuous chamber, one end of said mandrel located adjacent to said inlet means, said mandrel connected to said die means by laterally extending support members, pressurized air supply means, a single conduit means extending from said air supply means through one of said laterally extending support members into said chamber to provide a sole source of pressurized air continuously to said chamber, said conduit means in said chamber having a single aperture for directing a stream of pressurized air from said conduit directly towards said one end of said mandrel to cool said mandrel, an orifice in the other end of said mandrel located adjacent to said outlet means for supplying pressurized air to the annular extrudate as it issues from said outlet means, wherein said orifice has a throttle valve means located therein to restrict the flow of pressurized air therethrough, and a single passageway means in said housing extending through another one of said laterally extending members for communicating said chamber with the atmosphere for restricted venting of said pressurized chamber.

2. A die assembly as set forth in claim 1 wherein heat insulator means surrounds said conduit means in said laterally extending support member, and heat insulator means surrounds said passageway means to prevent a heat transfer.

3. A die assembly as set forth in claim 1 wherein a dead air space surrounds said conduit means in said laterally extending support member, and dead air space surrounds said passageway means in said other laterally extending member to prevent a heat transfer.

4. A die assembly comprising a die housing, said die housing having a central bore extending therethrough, said central bore having an inlet means at one end thereof and a discharge opening at the other end of said die housing, a mandrel located in said central bore having an outer surface that is cooperative with said central bore to define therewith an annular passageway, said mandrel having an apex portion located adjacent to said inlet means of said central bore, said mandrel being attached to said die with spider means, said mandrel having a hollow chamber extending the full length of said mandrel, one end of said mandrel being located adjacent to said discharge opening, said one end of said mandrel having a threaded bore, a throttle valve threadedly connected to said bore to control the flow of pressurized fluid from said chamber, pressurized air supply means, a single conduit means interconnecting said air supply means with said chamber, said conduit means having a single discharge orifice located in said chamber directing pressurized air therefrom towards said apex of said mandrel, an exhaust conduit means extending through said spider for connecting said chamber to atmosphere for exhausting pressurized air from said chamber to maintain a flow of air through said chamber to cool said outer surface of said mandrel to a predetermined temperature.

5. An apparatus for extruding plasticized bodies of synthetic plastic materials comprising plasticizing means; said plasticizing means having an outlet for discharging a first stream of plasticized material; an adapter mounted adjacent to said apparatus having at least a pair of diverging bores communicating with said outlet; each bore having an inner wall surface portion and an outer wall surface portion; said inner wall portions being longitudinally extending and adjacent to each other; said adapter having passageway means lying closely adjacent to each of said inner wall surface portions; conduit means connected to one end of each of said passageway means to vent said passageway means to atmosphere; a pair of die members; each die member having a central bore; each of said central bores having an inlet opening and a discharge opening; a mandrel located in each of said central bores having an outer wall surface portion that is cooperative with the encompassing central bore to define an annular passageway to facilitate the extrusion of an annular shaped parison from said discharge opening; each of said mandrels having a spider for connection to their respective said die members, each of said bores of said adapter communicating with one of said central bores of said die members; cooling means connected to said mandrels to cool the outer wall surface portions; and said cooling means connected to said passageway means to cool the inner wall surface portions of said adapter to provide a symmetrical heat profile and velocity profile in the extrudate from each of said die members.

6. An apparatus as set forth in claim 5 wherein said mandrel has a hollow interior to define a chamber; said cooling means for said mandrel comprises a single conduit extending into said chamber for directing coolant toward said inlet opening; said mandrel having a pair of vents for exhausting the coolant from said chamber; one of said vents exhausting the coolant in the direction of said discharge opening, and the other of said vents discharging its coolant outwardly through said spider.

7. An adapter for use with an extruder and a die wherein the adapter receives the extrudate from the extruder and directs the extrudate to the die wherein the adapter comprises: a housing having an inlet means and a pair of outlet means; said inlet means is connected to said pair of outlet means by a pair of diverging bores; said diverging bores having an inner wall surface portion and an outer wall surface portion; said inner wall surface portion being longitudinally extending and adjacent to each other at the juncture of said diverging bores and diverging away from each other as said bores diverge toward said outlet means; said inner wall surface portion being diametrically opposite said outer wall surface portion on each of said bores; passageway means lying closely adjacent to each of said inner wall surface portions extending from closely adjacent the juncture of said diverging bores to a point closely adjacent the outlet means; conduit means connected to each of said passageway means at said outlet means to vent said passageway means to atmosphere; and cooling means connected to said passageway means at the juncture of said diverging bores to pass coolant through said passageway means for exit at said conduit means.

References Cited

UNITED STATES PATENTS

| | | | |
|---|---|---|---|
| 3,609,809 | 10/1971 | Slicker | 18—30 JT X |
| 3,289,248 | 12/1966 | Scott et al. | 18—5 BH |
| 3,561,053 | 2/1971 | Pearson | 18—14 P |

H. A. KILBY, Jr., Primary Examiner

U.S. Cl. X.R.

425—380, 382